US011518524B2

(12) United States Patent
Schonhoff et al.

(10) Patent No.: US 11,518,524 B2
(45) Date of Patent: Dec. 6, 2022

(54) SYSTEMS AND METHODS OF SENSING TEMPERATURE OF AIR IN A PASSENGER AREA OF A FUSELAGE

(71) Applicant: The Boeing Company, Chicago, IL (US)

(72) Inventors: Matthew P. Schonhoff, Chicago, IL (US); Jeffrey G. Hatchel, Chicago, IL (US); Marcos Ubilla, Chicago, IL (US); Spencer L. Savage, Chicago, IL (US); Scott P. Ellsworth, Chicago, IL (US); Blake J. Burton, Chicago, IL (US); Jackson Poscablo, Chicago, IL (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 16/897,630

(22) Filed: Jun. 10, 2020

(65) Prior Publication Data
US 2021/0387736 A1    Dec. 16, 2021

(51) Int. Cl.
*B64D 13/08* (2006.01)
*B64D 13/06* (2006.01)

(52) U.S. Cl.
CPC ...... *B64D 13/08* (2013.01); *B64D 2013/0618* (2013.01); *B64D 2013/0625* (2013.01); *B64D 2013/0655* (2013.01)

(58) Field of Classification Search
CPC ........ B64D 13/08; B64D 13/06; B64D 13/02; B64D 13/006; B64D 2013/0618; B64D 2013/0688; B64D 2013/0611; B64D 2013/064; B64D 2013/0644; B64D 2013/0655; B64D 2221/00; B64D 33/02; B64D 33/04; F02C 6/08
See application file for complete search history.

(56) References Cited

U.S. PATENT DOCUMENTS

| 3,368,406 | A | * | 2/1968 | Himebaugh | G01K 13/02 374/138 |
| 6,619,589 | B2 | * | 9/2003 | Brasseur | B64D 11/00 454/103 |
| 6,971,607 | B2 | * | 12/2005 | McColgan | F24F 13/04 454/76 |
| 7,028,753 | B2 | * | 4/2006 | Sterner | H01L 23/467 165/122 |
| 9,511,868 | B2 | * | 12/2016 | Stengel | B64D 13/00 |
| 2006/0228558 | A1 | * | 10/2006 | Berry | B32B 27/286 428/412 |

(Continued)

*Primary Examiner* — Gordon A Jones
(74) *Attorney, Agent, or Firm* — McDonnell Boehnen Hulbert & Berghoff LLP

(57) ABSTRACT

An example temperature sensing device includes an air distribution inlet through which primary air is blown into via an environmental control system, a cabin air inlet through which secondary air enters from a passenger area of a fuselage and the cabin air inlet is coupled to the air distribution inlet through a duct and the secondary air is passively drawn into the cabin air inlet and to the duct due to a pressure difference present in the duct, and a temperature sensor coupled to the duct and positioned downstream of the cabin air inlet along an airflow path of the secondary air so as to be exposed to the secondary air drawn in through the cabin air inlet and flowing through the duct.

20 Claims, 10 Drawing Sheets

(56) References Cited

U.S. PATENT DOCUMENTS

| | | | | |
|---|---|---|---|---|
| 2009/0311951 | A1* | 12/2009 | Walkinshaw | F24F 13/26 |
| | | | | 96/60 |
| 2010/0009617 | A1* | 1/2010 | Huber | B64D 13/00 |
| | | | | 454/76 |
| 2013/0214091 | A1* | 8/2013 | Hillel | F01N 5/04 |
| | | | | 60/624 |
| 2016/0033152 | A1* | 2/2016 | Ellsworth | F24F 13/0236 |
| | | | | 454/333 |
| 2016/0231031 | A1* | 8/2016 | Bruno | F02C 7/141 |
| 2016/0377316 | A1* | 12/2016 | Ellsworth | B64D 13/06 |
| | | | | 454/261 |
| 2019/0055024 | A1* | 2/2019 | Fagundes | B64D 13/06 |
| 2019/0085770 | A1* | 3/2019 | Combes | F02C 7/20 |
| 2020/0262567 | A1* | 8/2020 | Meckes | B64D 11/0015 |

* cited by examiner

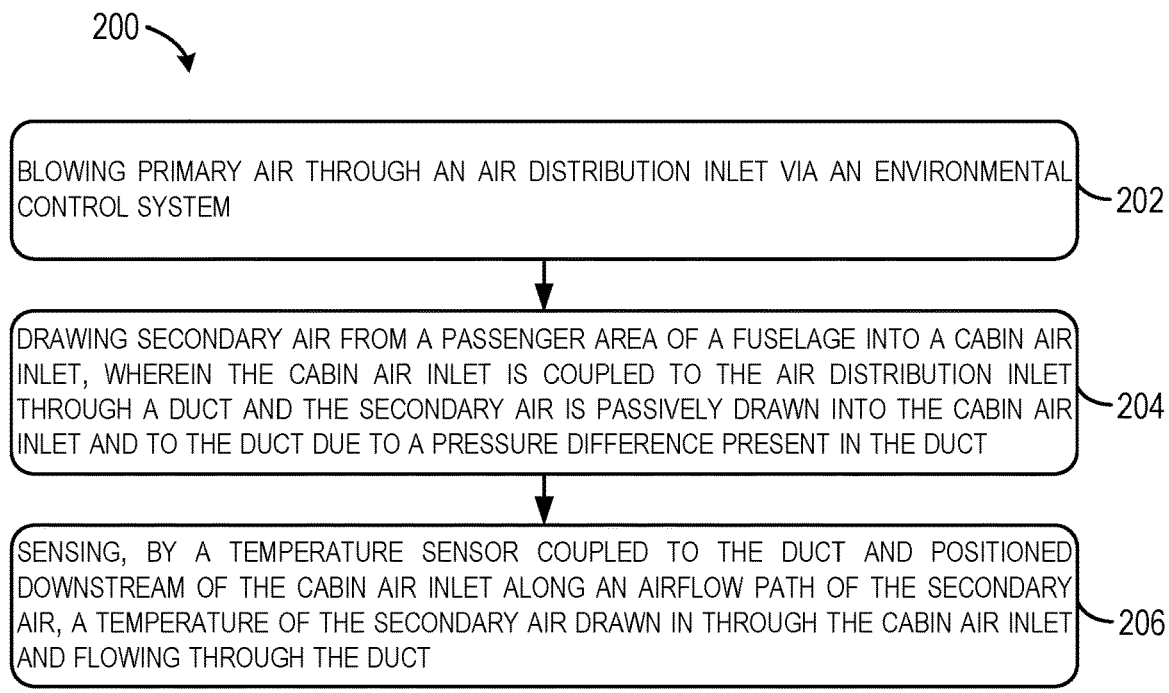
FIG. 14
FIG. 15
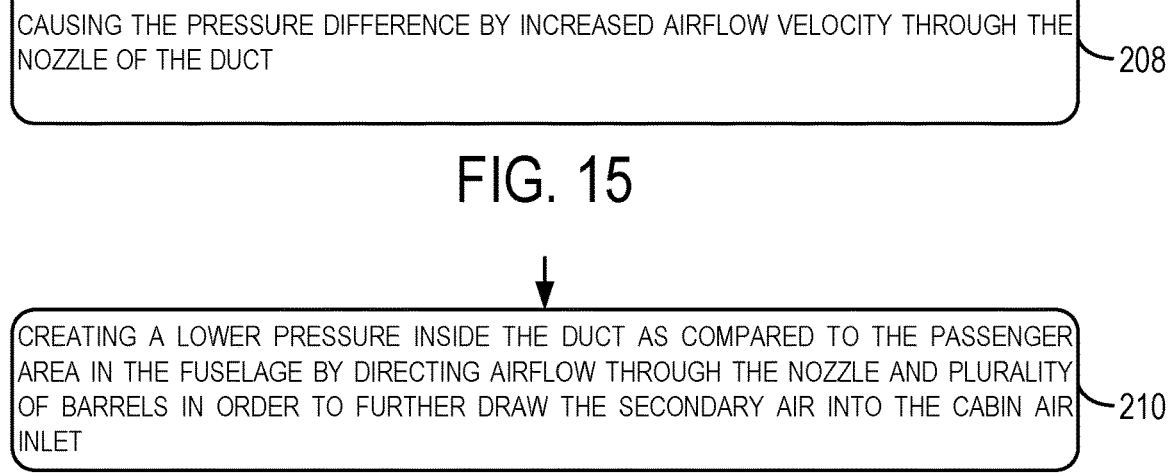
FIG. 16
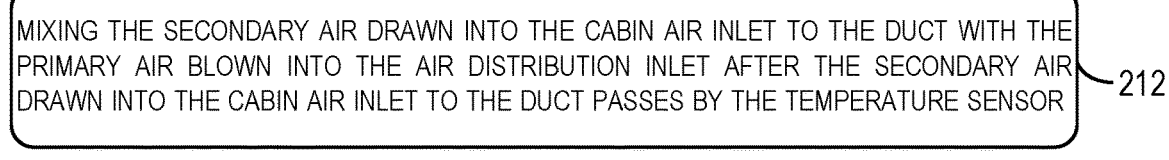
FIG. 17

SYSTEMS AND METHODS OF SENSING TEMPERATURE OF AIR IN A PASSENGER AREA OF A FUSELAGE

FIELD

The present disclosure relates generally to systems and methods to sense temperature of air in a passenger area of a fuselage, and more particularly, to temperature sensing devices and aircraft systems including a temperature sensor positioned downstream of a cabin air inlet to be exposed to air drawn in through the cabin air inlet and flowing through the duct.

BACKGROUND

Modern passenger transport aircraft typically operate at elevated altitudes in order to avoid weather and to obtain other advantages generally associated with high altitude flight. Accordingly, such aircraft are equipped with an environmental control system that provides pressurized and temperature controlled air to passengers within a cabin of the aircraft. Briefly and in general terms, the environmental control system typically extracts air at an elevated temperature and pressure from a compressor section of one or more of the engines of the aircraft, suitably conditions the extracted air, and distributes the conditioned air to the cabin to provide a comfortable environment for the flight crew and passengers within the aircraft.

Air temperatures are generally closely regulated to achieve a desired comfort level to flight crew and passengers. Accordingly, the flight deck and the passenger compartment generally include various temperature sensing devices positioned in flight deck and passenger compartments that are operable to control the system to admit additional cold air when additional cooling is desired, and to correspondingly add additional higher temperature air when additional heating is desired.

An example temperature sensing device includes a powered fan to draw cabin air into an air duct that contains a temperature sensor. The fan requires an electrical power source, and can add to complexity of the device. There is a desire for an improved temperature sensing device that operates without a powered fan to draw cabin air into an air duct that contains a temperature sensor.

SUMMARY

In an example, a temperature sensing device is described that includes an air distribution inlet through which primary air is blown into via an environmental control system, a cabin air inlet through which secondary air enters from a passenger area of a fuselage and the cabin air inlet is coupled to the air distribution inlet through a duct and the secondary air is passively drawn into the cabin air inlet and to the duct due to a pressure difference present in the duct, and a temperature sensor coupled to the duct and positioned downstream of the cabin air inlet along an airflow path of the secondary air so as to be exposed to the secondary air drawn in through the cabin air inlet and flowing through the duct.

In another example, an aircraft system is described that includes an interior panel of a fuselage including an air grille, and a temperature sensing device. The temperature sensing device includes an air distribution inlet through which primary air is blown into via an environmental control system, a cabin air inlet coupled to the air grille and through which secondary air enters from a passenger area of the fuselage and the cabin air inlet is coupled to the air distribution inlet through a duct and the secondary air is passively drawn into the cabin air inlet and to the duct due to a pressure difference present in the duct, and a temperature sensor coupled to the duct and positioned downstream of the cabin air inlet along an airflow path of the secondary air so as to be exposed to the secondary air drawn in through the cabin air inlet and flowing through the duct.

In another example, a method of sensing temperature of air in a passenger area of a fuselage is described. The method includes blowing primary air through an air distribution inlet via an environmental control system, drawing secondary air from a passenger area of a fuselage into a cabin air inlet and the cabin air inlet is coupled to the air distribution inlet through a duct and the secondary air is passively drawn into the cabin air inlet and to the duct due to a pressure difference present in the duct, and sensing, by a temperature sensor coupled to the duct and positioned downstream of the cabin air inlet along an airflow path of the secondary air, a temperature of the secondary air drawn in through the cabin air inlet and flowing through the duct.

The features, functions, and advantages that have been discussed can be achieved independently in various examples or combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 14 shows a flowchart of an example of a method of sensing temperature of air in the passenger area of the fuselage, according to an example implementation.

FIG. 15 shows a flowchart of an example function that is performed with the method shown in FIG. 14, according to an example implementation.

FIG. 16 shows another flowchart of an example function that is performed with the method shown in FIG. 14, according to an example implementation.

FIG. 17 shows another flowchart of an example function that is performed with the method shown in FIG. 14, according to an example implementation.

DETAILED DESCRIPTION

Disclosed examples will now be described more fully hereinafter with reference to the accompanying drawings, in which some, but not all of the disclosed examples are shown. Indeed, several different examples are described and should not be construed as limited to the examples set forth herein. Rather, these examples are described so that this disclosure will be thorough and complete and will fully convey the scope of the disclosure to those skilled in the art.

Within examples, a temperature sensing device is described that includes an air distribution inlet through which primary air is blown into via an environmental control system, a cabin air inlet through which secondary air enters from a passenger area of a fuselage and the secondary air is passively drawn into the cabin air inlet and to the duct due to a pressure difference present in the duct, and a temperature sensor coupled to the duct and positioned downstream of the cabin air inlet along an airflow path of the secondary air so as to be exposed to the secondary air drawn in through the cabin air inlet and flowing through the duct.

Within examples, the temperature sensing device uses air flow from the environmental control system to draw cabin air across the temperature sensor without the use of a fan. Geometry of the duct and interior barrels direct airflow in a way that creates low pressure inside the duct. The low pressure draws cabin air across the temperature sensor. The temperature sensor then measures cabin temperature for the environmental control system.

Figure 1:
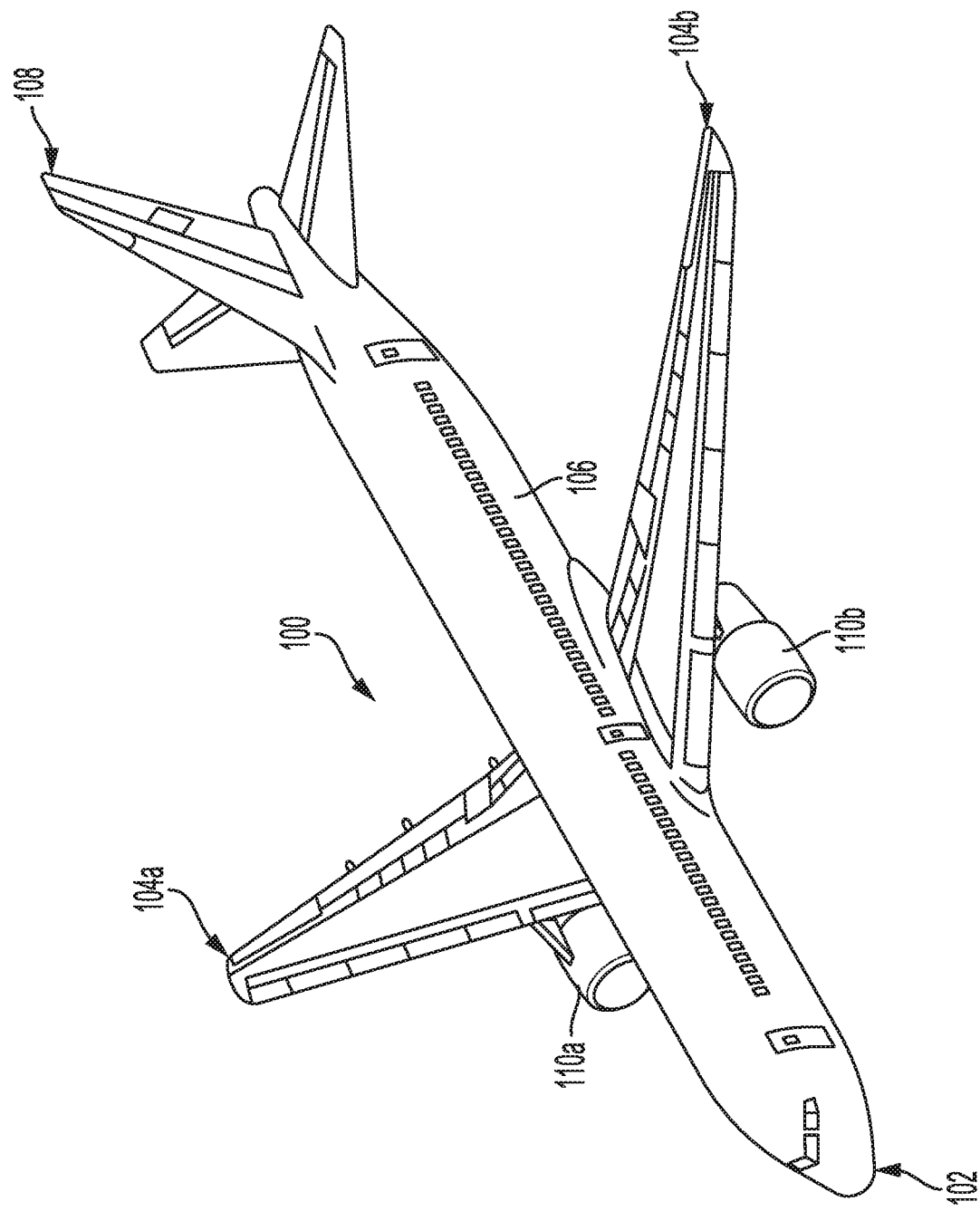
FIG. 1 illustrates an aircraft, according to an example implementation.

Referring now to the figures, FIG. 1 illustrates an aircraft 100, according to an example implementation. The aircraft 100 includes a nose 102, wings 104a-b, a fuselage 106, a tail 108, and engines 110a-b. Although FIG. 1 illustrates an example of a commercial passenger aircraft, other types of aircraft are used with examples described herein. In addition, depending on the type of aircraft fewer or more engines are included.

Figure 2:
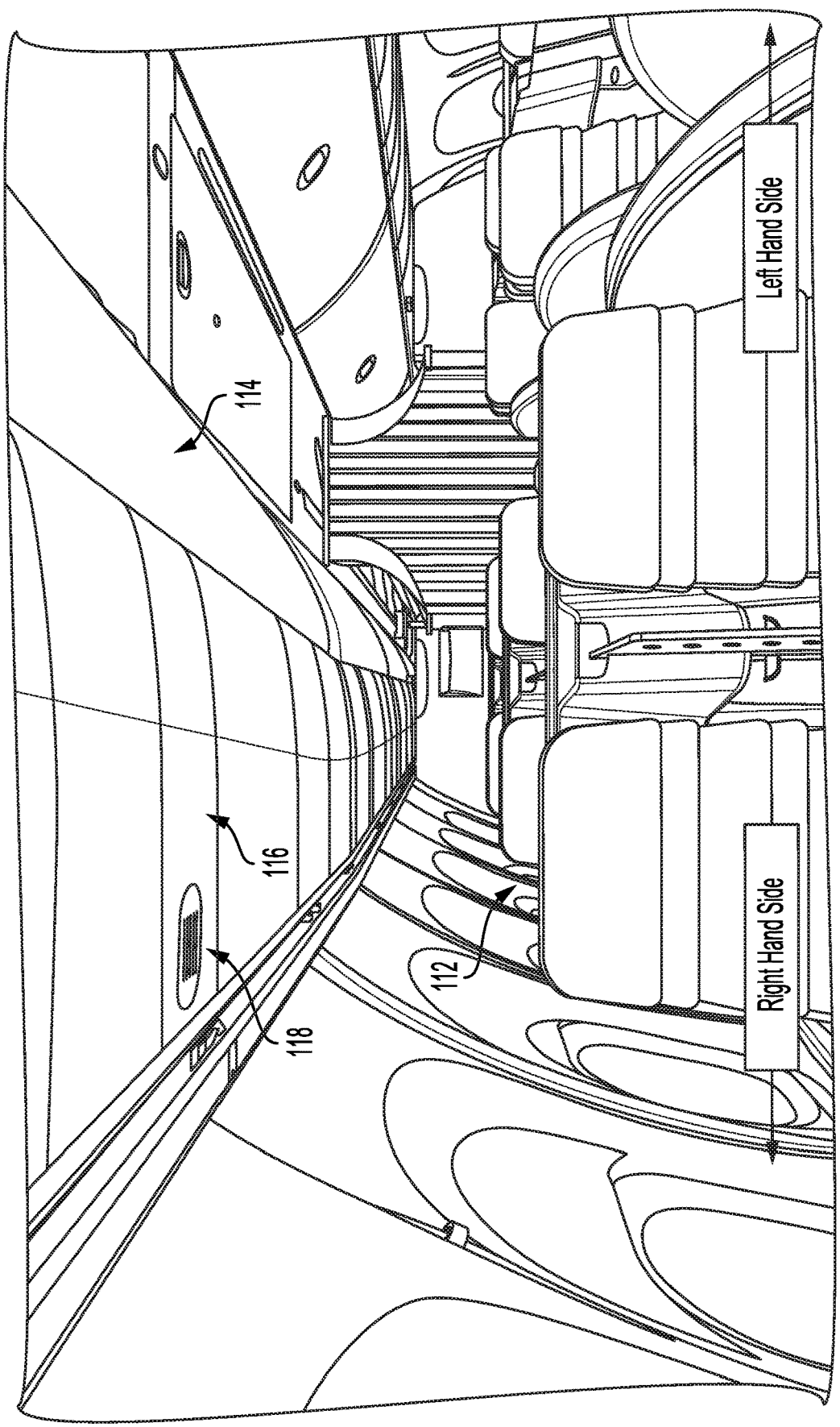
FIG. 2 illustrates a view inside the fuselage, aft facing, of a passenger area, according to an example implementation.

FIG. 2 illustrates a view inside the fuselage 106, aft facing, of a passenger area 112, according to an example implementation. The passenger area 112 in the fuselage 106 includes seating on either side of the aircraft 100. In the example shown in FIG. 2, the aircraft 100 includes two rows with one row on a right hand side of the aircraft 100 and the other row on a left hand side of the aircraft 100. Overhead stowage bins 114 are included along a ceiling of the fuselage 106 along both rows. Above seating of the passenger area 112 are interior panels, such as interior panel 116, of the fuselage 106 including an air grille 118. Air from the passenger area 112 of the fuselage 106 is drawn into the air grille 118 and is directed to a temperature sensing device 122 (see, e.g., FIG. 3A) to determine a temperature of the passenger area 112 of the fuselage 106.

Figure 3A:
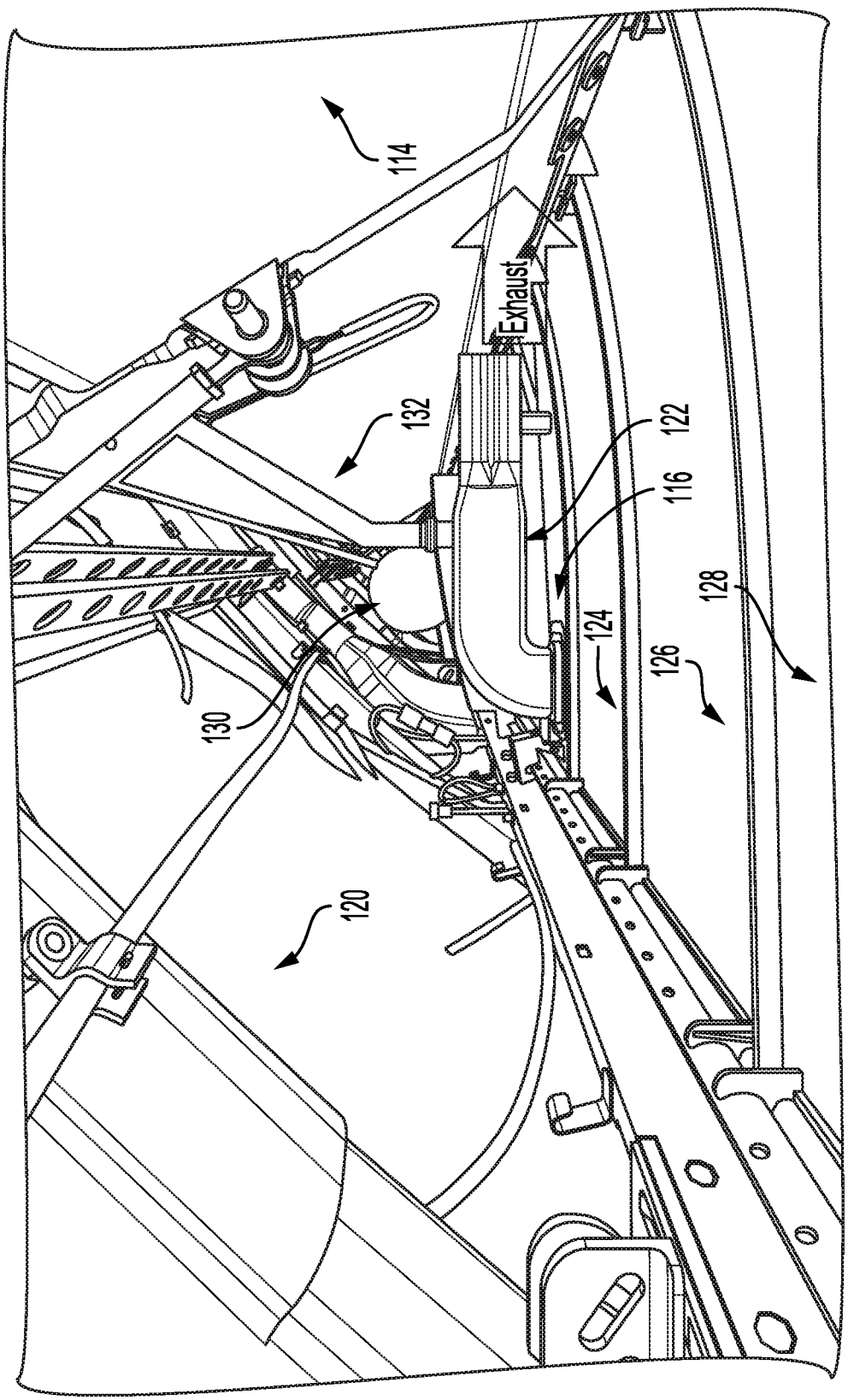
FIG. 3A illustrates a view inside the fuselage, aft facing, of an internal area above the passenger area, according to an example implementation.

FIG. 3A illustrates a view inside the fuselage 106, aft facing, of an internal area above the passenger area 112, according to an example implementation. FIG. 3A illustrates a fuselage perimeter 120 of the fuselage 106, and a temperature sensing device 122 is mounted to a surface of the interior panel 116 opposite the passenger area 112 of the fuselage 106. Additional interior panels 124, 126, and 128 are shown and labeled for reference. Although only one temperature sensing device 122 is illustrated for the interior panel 116, a temperature sensing device can be included on each interior panel, on every other interior panel, or in any arrangement on the interior panels. Thus, more than one temperature sensing device 122 can be included in the fuselage 106, and a number as well as arrangement of temperature sensing devices depends on a size and configuration of the aircraft 100, for example.

The temperature sensing device 122 is connected to an environmental control system 130 through a hose 132. As shown in FIG. 3A, the arrangement of the hose 132 is one example, and the hose 132 may be arranged differently, as described below. The environmental control system 130 receives compressed, clean air from compressor stages of the engines 110a-b or when on the ground from an auxiliary power unit (APU) or a ground source. The environmental control system 130 supplies or blows air into the temperature sensing device 122. The environmental control system 130 also supplies or blows air into gasper grilles above passenger seats (not shown) to blow air into the passenger area 112 in the fuselage 106. Within an example operation, gaspers are temporarily turned off during certain phases of flight (e.g., during take-off and climb) when a load on the engines 110a-b from bleed-air demands is minimized.

The temperature sensing device 122 is utilized to determine a temperature inside the passenger area 112 of the fuselage. The determined temperature is used to control the environmental control system 130 air output to admit additional cold air when additional cooling is desired, and to correspondingly add additional higher temperature air when additional heating is desired.

Figure 3B:
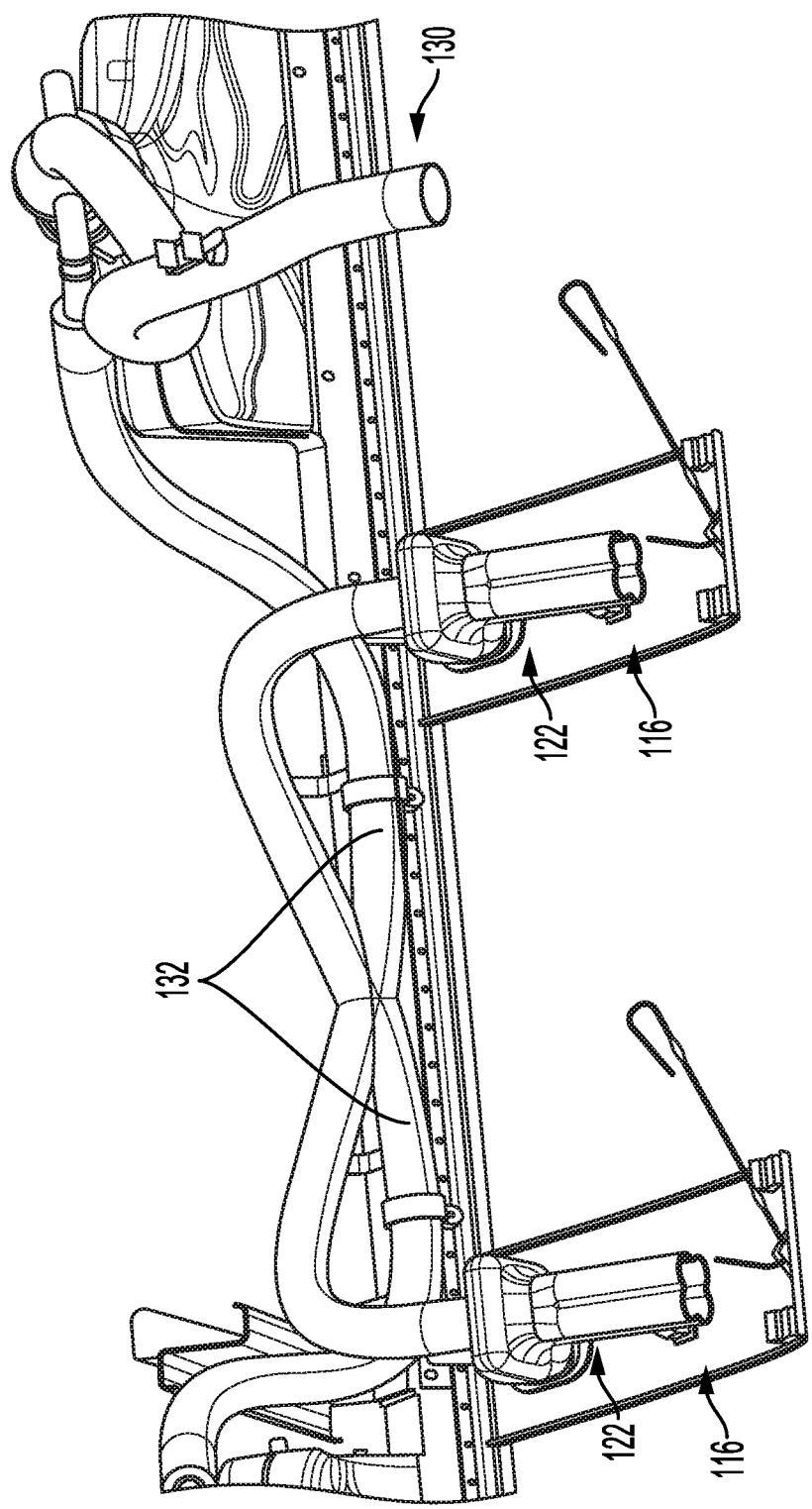
FIG. 3B illustrates another view inside the fuselage, aft facing, of an internal area above the passenger area, according to an example implementation.

FIG. 3B illustrates another perspective view inside the fuselage 106 of an internal area above the passenger area 112, according to an example implementation. In FIG. 3B, the hose 132 arrangement is shown more clearly as connecting the temperature sensing device 122 to the environmental control system 130, for example.

Figure 4:
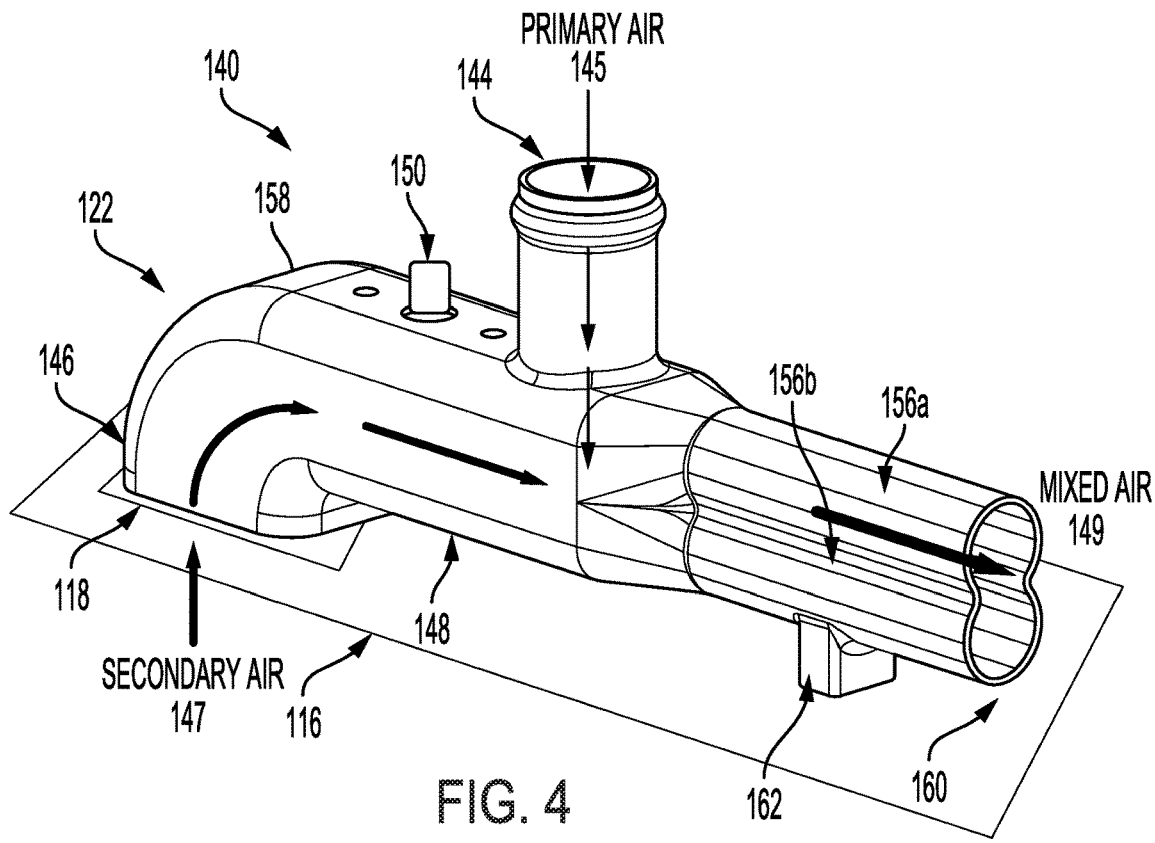
FIG. 4 illustrates a perspective view of an aircraft system including an example of the temperature sensing device, according to an example implementation.
Figure 5:
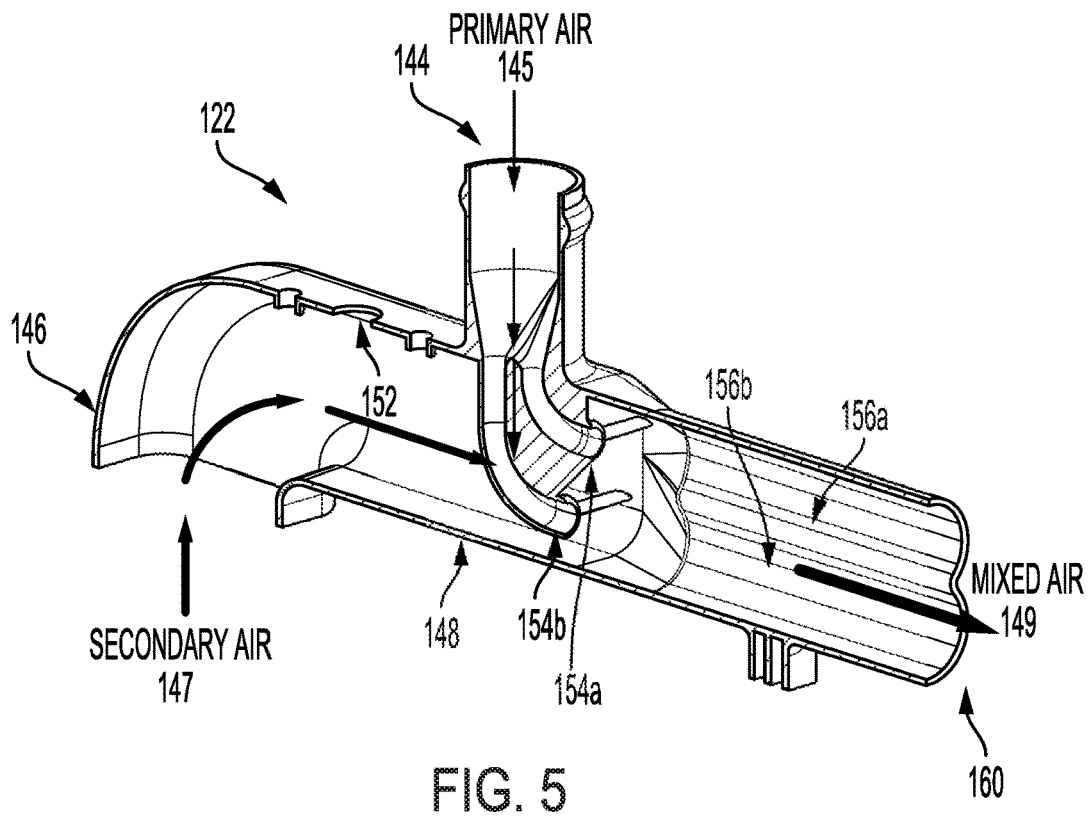
FIG. 5 illustrates a cross-sectional view of an example of the temperature sensing device, according to an example implementation.

FIG. 4 illustrates a perspective view of an aircraft system 140 including an example of the temperature sensing device 122, according to an example implementation. FIG. 5 illustrates a cross-sectional view of an example of the temperature sensing device 122, according to an example implementation.

The aircraft system 140 includes the interior panel 116 of the fuselage 106 including the air grille 118, and the temperature sensing device 122. The temperature sensing device 122 includes an air distribution inlet 144 through which primary air 145 is blown into via the environmental control system 130, and a cabin air inlet 146 through which secondary air 147 enters from the passenger area 112 of the fuselage 106, and the cabin air inlet 146 is coupled to the air distribution inlet 144 through a duct 148. The secondary air 147 is passively drawn into the cabin air inlet 146 and to the duct 148 due to a pressure difference present in the duct 148. In an example, the cabin air inlet 146 is coupled to the air grille 118 of the interior panel 116, and the secondary air 147 enters the cabin air inlet 146 through the air grille 118.

The temperature sensing device 122 also includes a temperature sensor 150 coupled to the duct 148 and positioned downstream of the cabin air inlet 146 along an airflow path of the secondary air 147 so as to be exposed to the secondary air 147 drawn in through the cabin air inlet 146 and flowing through the duct 148. The duct 148 includes an opening 152 into which a portion of the temperature sensor 150 is inserted so as to be exposed to the secondary air 147 drawn in through the cabin air inlet 146 and flowing through the duct 148.

As mentioned, a pressure difference between air pressure in the passenger area 112 of the fuselage 106 and air pressure inside the duct 148 is present. This is due to the primary air 145 being blown into the air distribution inlet 144. The duct 148 also has nozzles 154a-b and the pressure difference is further caused by increased airflow velocity through the nozzles 154a-b and then through the barrel of the duct 148. The nozzles 154a-b include, for example, small tubes inside the duct 148.

In some examples, the duct 148 includes barrels 156a-b coupled to the nozzles 154a-b. The nozzles 154a-b and the barrels 156a-b are coupled to the air distribution inlet 144 to direct airflow so as to create a lower pressure inside the duct 148 as compared to the passenger area 112 in the fuselage 106 to further draw the secondary air 147 into the cabin air inlet 146. In one example, the nozzles 154a-b and the barrels 156a-b are additively manufactured components. Similarly, in one example, the air distribution inlet 144, the cabin air inlet 146, and the duct 148 all include additively manufactured components.

The secondary air 147 enters the cabin air inlet 146 and travels along an airflow path through the duct 148. In the example shown in FIG. 4, a portion 158 of the duct 148 that connects to the cabin air inlet 146 is an angled portion. However, the duct 148 can alternatively include a straight non-angled structural pathway as well. The secondary air 147 drawn into the cabin air inlet 146 to the duct mixes with the primary air 145 blown into the air distribution inlet 144 after the secondary air 147 drawn into the cabin air inlet 146 to the duct 148 passes by the temperature sensor 150 (e.g., shown as mixed air 149). In one example, the temperature sensing device 122 also includes an exhaust 160 coupled to the duct 148 to exhaust the primary air 145 mixed with the secondary air 147 to an area between the passenger area 112 of the fuselage 106 and the fuselage perimeter 120 of the fuselage 106.

In operation, the temperature sensing device 122 uses airflow from the environmental control system 130 to draw cabin air across the temperature sensor 150, which measures cabin temperature for the environmental control system 130. The secondary air 147 is drawn into the cabin air inlet 146 due to air ejector principles. For example, a drop in pressure is caused by increased velocity through the nozzles 154a-b (e.g., a restriction) that then pulls (entrains) additional secondary air through the cabin air inlet 146. A total entrained airflow is due to the Venturi Effect and the entrainment ratio.

Airflow momentum is transferred from the primary air 145 to the secondary air 147. To do so, the primary air 145 is accelerated in the nozzles 154a-b (e.g., a smaller diameter area). The accelerated primary air 145 mixes and transfers momentum to the secondary air 147 along the barrels 156a-b. This creates a pressure difference that draws the secondary air 147 into the duct 148 and the barrels 156a-b. In one example, a single nozzle is used to cause an increase in velocity, with a single barrel section for mixing, although the single barrel would need to be a sufficient length to allow for adequate momentum transfer to generate necessary secondary airflow for the application. To reduce length and enable the temperature sensing device 122 to fit overhead the passenger area 112 of the fuselage 106, multiple nozzles and barrels are used in the temperature sensing device 122. For example, the nozzles 154a-b and the barrels 156a-b are used in parallel.

The duct 148 can be tuned to optimize airflow that is drawn in and over the temperature sensor 150 by changing a number of the nozzles 154a-b and the barrels 156a-b, for example.

In some examples, the length of the barrels 156a-b need to provide enough distance for the momentum transfer to take place. A diameter and length combination of the barrels 156a-b can be determined such that the air velocity pressure at the exhaust 160 is small compared to a gage static pressure at the cabin air inlet 146 to provide a highest pressure rise in the secondary airflow path.

Within examples, the configuration of the duct 148 and the nozzles 154a-b and the barrels 156a-b direct airflow to create low pressure inside the duct 148 that draws the secondary air 147 into the cabin air inlet 146 and past the temperature sensor 150. The temperature sensing device 122 has no moving parts, and therefore does not require any electricity or related hardware (other than to power the temperature sensor 150).

The temperature sensing device 122 can be used to replace a typical powered fan device used to draw cabin air using the gasper air system. Thus, the temperature sensing device 122 has many benefits including, for instance, lower cost and ease of assembly (due to fewer parts), and also decreased noise (compared to conventional temperature sensing devices) with no fan operating. Further, with no moving parts, there is less of a chance to have less than optimal performance of the temperature sensing device. In addition, in examples, the temperature sensing device 122 is additively manufactured making production more efficient and in real-time.

In FIG. 4, the temperature sensing device 122 is mounted to a surface of the interior panel 116 using a mount 162. Any type of mount can be used. In one example, the temperature sensing device 122 and the interior panel 116 are an integral part. For instance, the temperature sensing device 122 and the interior panel 116 can be additively manufactured together.

Figure 6:
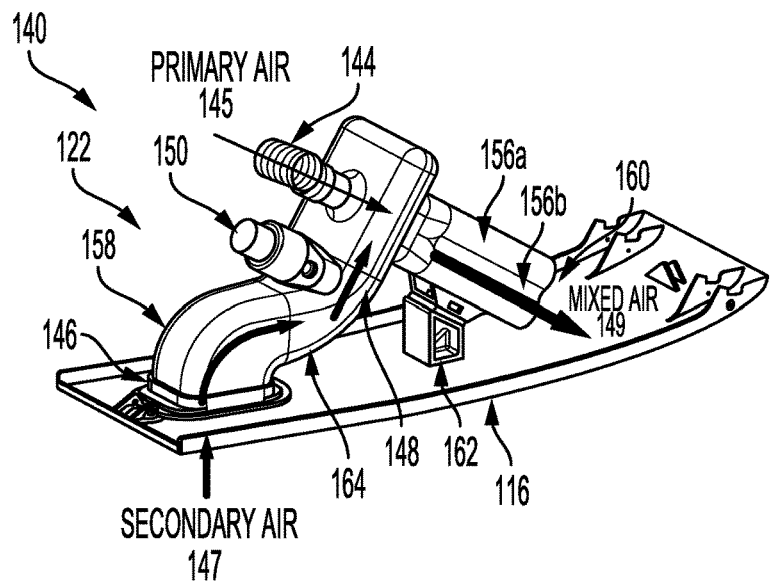
FIG. 6 illustrates a perspective view of another example of the aircraft system including another example of the temperature sensing device, according to an example implementation.
Figure 7:
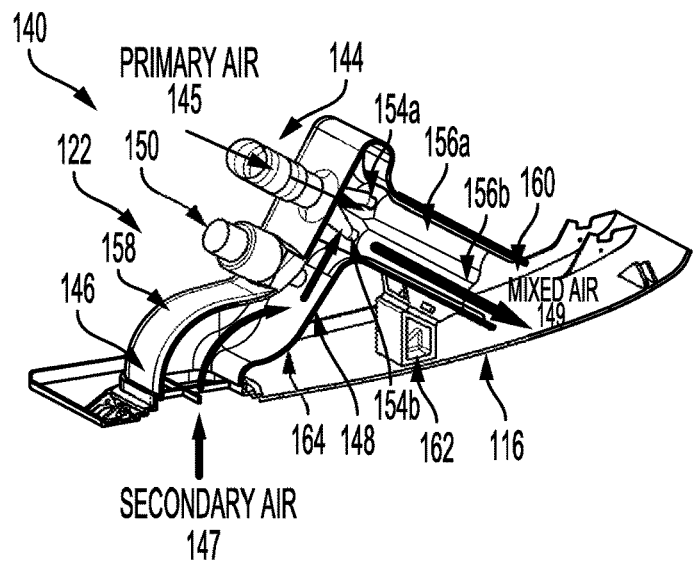
FIG. 7 illustrates a cross-sectional view of an example of the aircraft system in FIG. 6, according to an example implementation.
Figure 8:
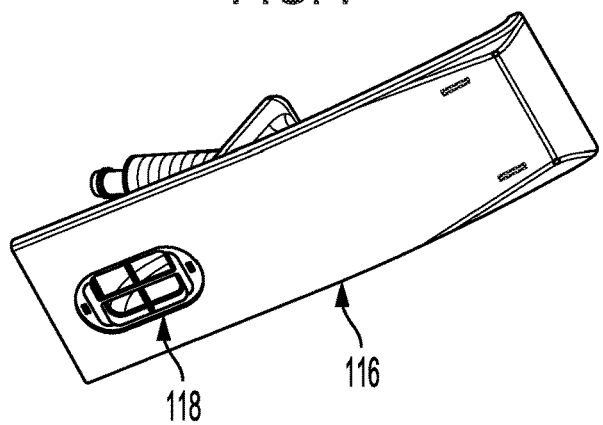
FIG. 8 illustrates a bottom view of an example of the aircraft system in FIG. 6, according to an example implementation.
Figure 9:
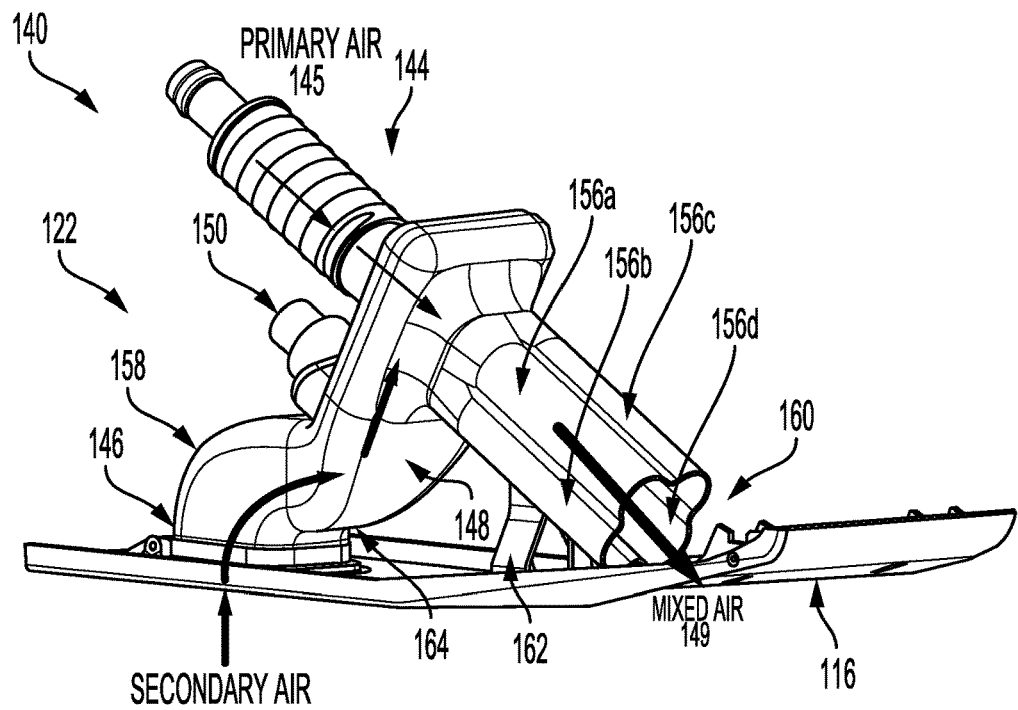
FIG. 9 illustrates another perspective view of the aircraft system shown in FIGS. 6-8, according to an example implementation.
Figure 10:
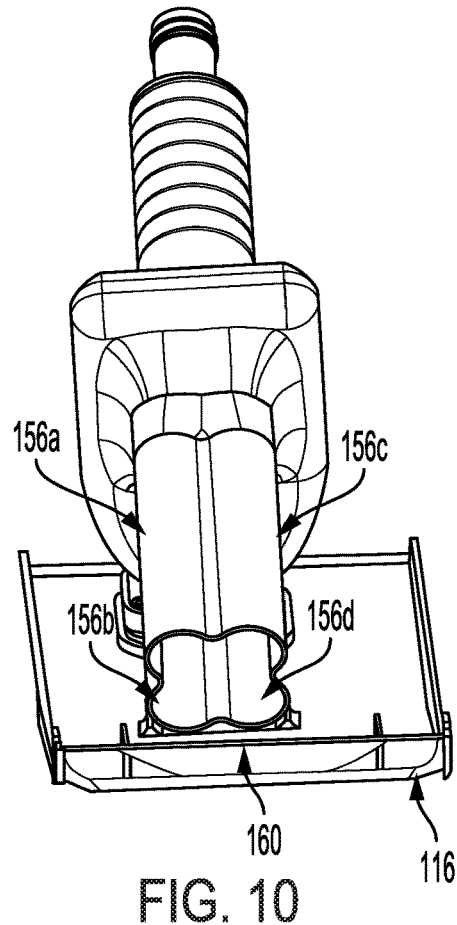
FIG. 10 illustrates a front view of the aircraft system shown in FIGS. 6-8 according to an example implementation.

FIG. 6 illustrates a perspective view of another example of the aircraft system 140 including another example of the temperature sensing device 122, according to an example implementation. FIG. 7 illustrates a cross-sectional view of an example of the aircraft system 140 in FIG. 6, according to an example implementation. FIG. 8 illustrates a bottom view of an example of the aircraft system 140 in FIG. 6, according to an example implementation. FIG. 9 illustrates another perspective view of the aircraft system 140 shown in FIGS. 6-8, according to an example implementation. FIG. 10 illustrates a front view of the aircraft system 140 shown in FIGS. 6-8 according to an example implementation.

The temperature sensing device 122 shown in FIGS. 6-10 is coupled to the interior panel 116 of the fuselage 106 including the air grille 118 (as shown in the bottom view in FIG. 8), and the temperature sensing device 122 includes the same components as described above with respect to FIGS. 4-5. However, the temperature sensing device 122 shown in FIGS. 6-8 includes the duct 148 arranged to be angled with respect to a plane of the interior panel 116 (whereas the duct 148 in the temperature sensing device 122 shown in FIGS. 4-5 is substantially horizontal to a plane of the interior panel 116).

Thus, the duct 148 of the temperature sensing device 122 shown in FIGS. 6-10 includes two angled portions, namely the portion 158 of the duct 148 that connects to the cabin air inlet 146 is an angled portion and a second angled portion 164 is included as well. The configuration of the example of the temperature sensing device 122 shown in FIGS. 6-10 enables the temperature sensing device 122 to fit into smaller spaces, for example. With this configuration, the duct 148 and the nozzles 154a-b and the barrels 156a-b are shorter in length, and thus, two additional nozzles and barrels 156c-d are included (as seen in the views illustrated in FIGS. 9-10). With the four nozzles and barrels 156a-d, it enables a sufficient difference in pressure to draw the secondary air 147 (e.g., cabin air) into the cabin air inlet 146 by blowing the primary air 145 into the air distribution inlet 144.

Thus, the duct 148 can be tuned to include fewer or more nozzles and barrels to cause a lesser or greater pressure difference to change how much of the secondary air 147 is drawn into the cabin air inlet 146. It is desirable for the temperature sensor 150 to sense a temperature of air that is representative of the cabin, and thus, a flow of the secondary air 147 needs to be of a sufficient volume of air for a representation of a temperature of the cabin.

Thus, the primary air 145 is blown into the air distribution inlet 144, and then mixes with the secondary air 147 that entered the cabin air inlet 146 from the passenger area 112 of the fuselage 106 and passed by the temperature sensor 150 before mixing with the primary air 145. The mixed air 149 is output of the temperature sensing device 122 through the exhaust 160.

Figure 11:
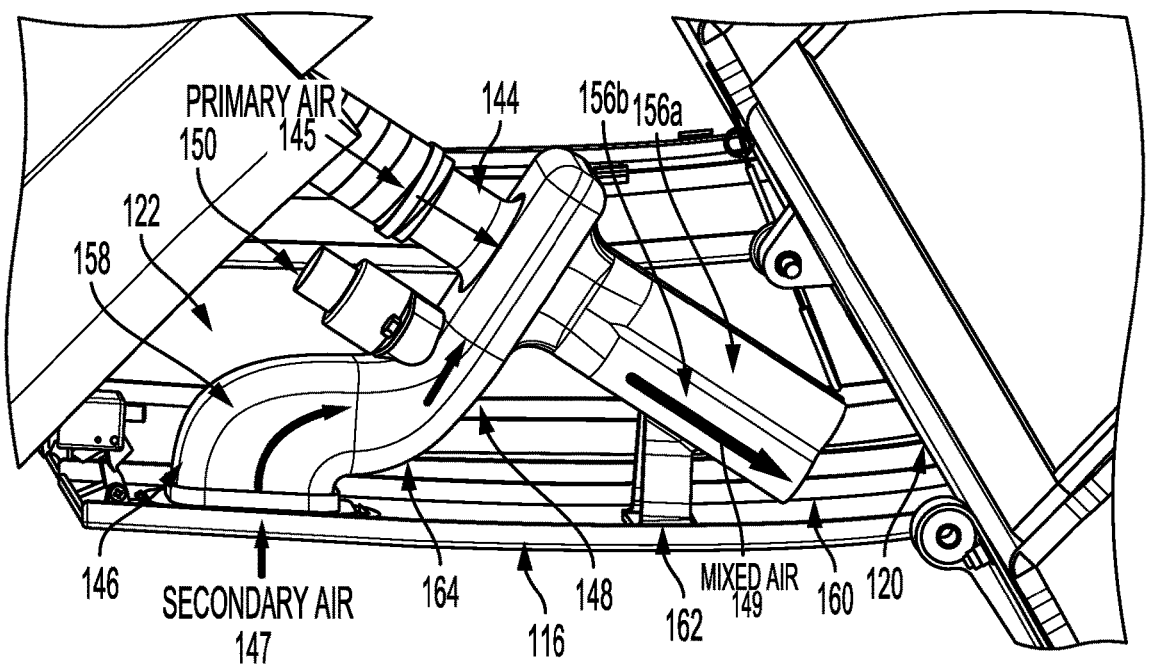
FIG. 11 illustrates a side view of the aircraft system of FIG. 6 installed in the aircraft on a right hand side (aft facing), of an internal area above the passenger area, according to an example implementation.
Figure 12:
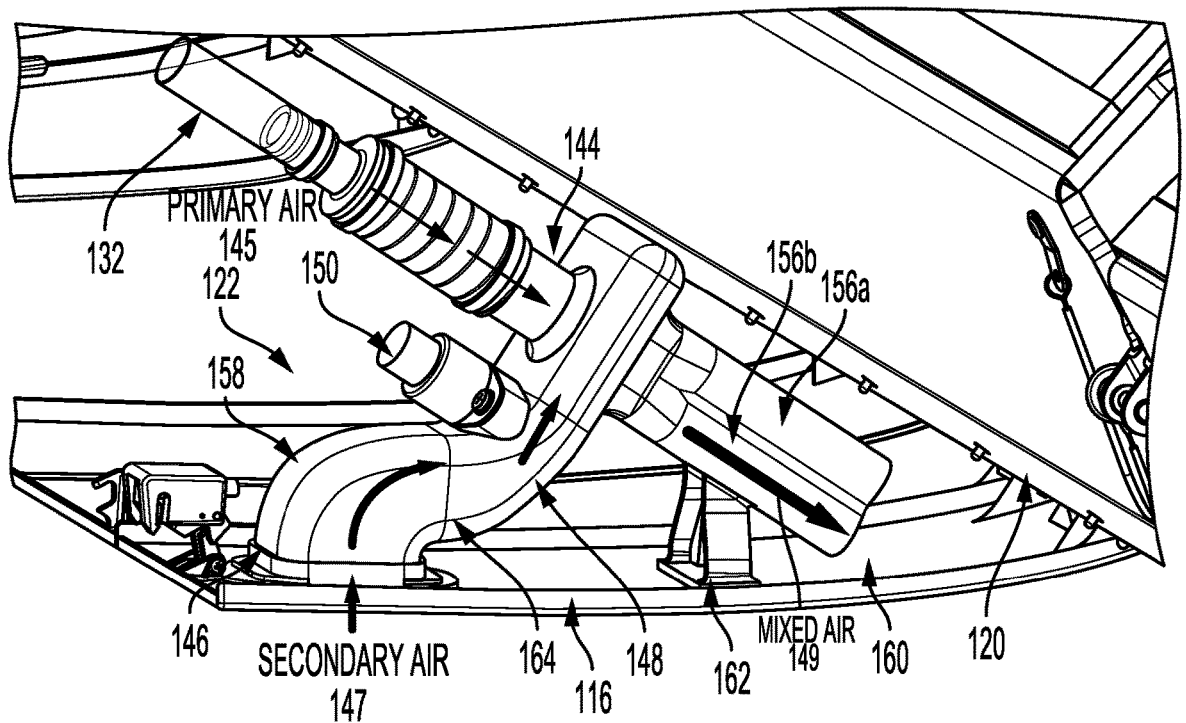
FIG. 12 illustrates a perspective view of the aircraft system of FIG. 6 installed in the aircraft on a right hand side (aft facing), of an internal area above the passenger area, according to an example implementation.
Figure 13:
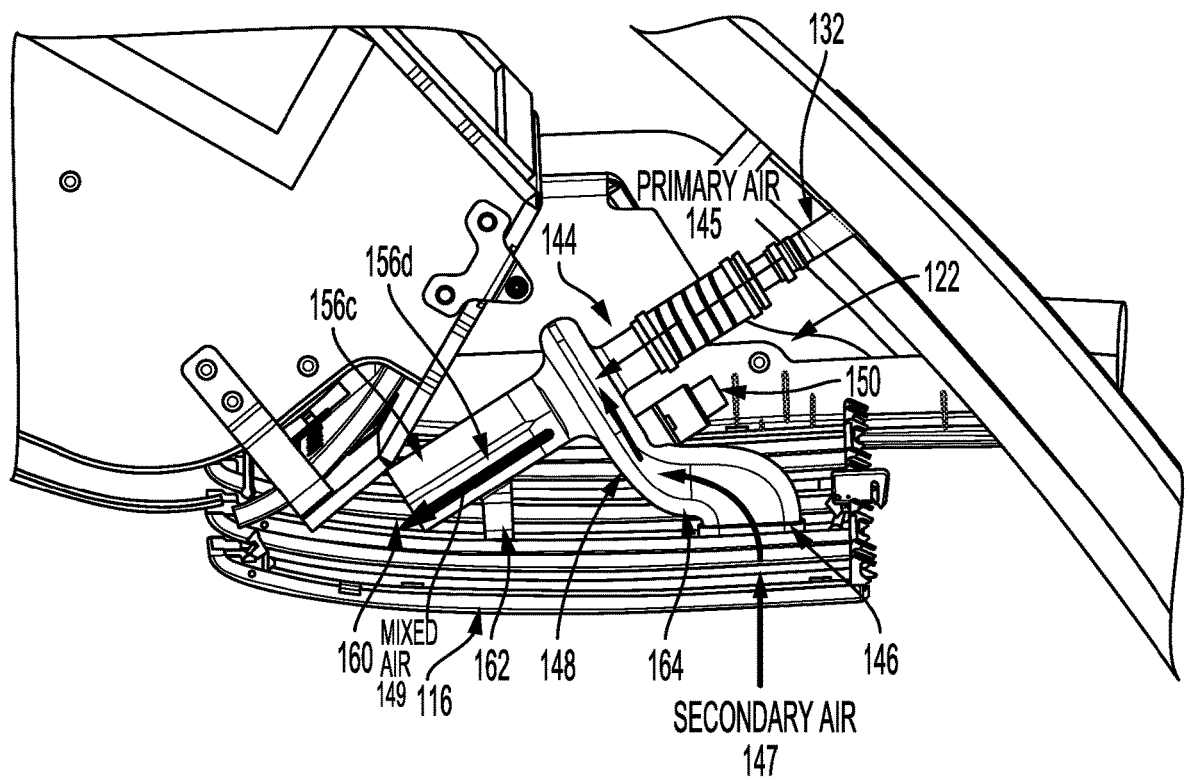
FIG. 13 illustrates a side view of the aircraft system of FIG. 6 installed in the aircraft on a left hand side (aft facing), of an internal area above the passenger area, according to an example implementation.

FIG. 11 illustrates a side view of the aircraft system 140 of FIG. 6 installed in the aircraft on a right hand side (aft facing), according to an example implementation. FIG. 12 illustrates a perspective view of the aircraft system 140 of FIG. 6 installed in the aircraft on a right hand side (aft facing), according to an example implementation. FIG. 13 illustrates a side view of the aircraft system 140 of FIG. 6 installed in the aircraft on a left hand side (aft facing), according to an example implementation.

In FIGS. 11-13, it can be seen that the primary air 145 mixed with the secondary air 147 is exhausted through the exhaust 160 to an area between the passenger area 112 of the fuselage 106 and the fuselage perimeter 120 of the fuselage 106. Generally, the mixed air 149 is exhausted in a ceiling panel area of the fuselage 106, for example. The exhausted air can generally be routed in any direction as long as the exhausted air does not feed back into an area of the passenger area 112 that is nearby the cabin air inlet 146, for example, that would recirculate and impact temperatures of air being sampled.

FIGS. 12-13 illustrate the hose 132 connected to the air distribution inlet 144 to provide the primary air 145 into the temperature sensing device 122. The hose 132 is routed along the fuselage perimeter 120 to the environmental control system 130 (not shown in FIGS. 12-13).

Although the aircraft system 140 is shown and described as being positioned in a ceiling of the fuselage 106 or above the passenger area 112, the aircraft system 140 may alternatively be positioned in other areas of the fuselage 106. In one example, the aircraft system 140 is positioned in a galley area of the aircraft 100, in a floor panel of the aircraft 100, or in a side wall panel of the aircraft 100.

FIG. 14 shows a flowchart of an example of a method 200 of sensing temperature of air in the passenger area 112 of the fuselage 106, according to an example implementation. Method 200 shown in FIG. 14 presents an example of a method that could be used with the aircraft 100 shown in FIG. 1, with the aircraft system 140 shown in FIGS. 4 and 6-10, or with the temperature sensing device 122 shown in FIGS. 3A-13, for example. Further, devices or systems are used or configured to perform logical functions presented in FIG. 14. In some instances, components of the devices and/or systems are configured to perform the functions such that the components are actually configured and structured (with hardware and/or software) to enable such performance. In other examples, components of the devices and/or systems are arranged to be adapted to, capable of, or suited for performing the functions, such as when operated in a specific manner. Method 200 includes one or more operations, functions, or actions as illustrated by one or more of blocks 202-206. Within examples, although the blocks are illustrated in a sequential order, these blocks are also able to be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code is be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 14, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes blowing primary air 145 through the air distribution inlet 144 via the environmental control system 130.

At block 204, the method 200 includes drawing secondary air 147 from the passenger area 112 of the fuselage 106 into the cabin air inlet 146, and the cabin air inlet 146 is coupled to the air distribution inlet 144 through the duct 148. The secondary air 147 is passively drawn into the cabin air inlet 146 and to the duct 148 due to a pressure difference present in the duct 148.

For instance, no fan is required to draw the secondary air 147 into the cabin air inlet 146. As compared with some existing systems, a fan is replaced by an air pressure system, e.g., the environmental control system, which blows primary air 145 into the air distribution inlet 144. Thus, pressurized air blown into the temperature sensing device 122 draws air into the temperature sensing device 122 and past the temperature sensor 150 in a passive manner.

FIG. 15 shows a flowchart of an example function that is performed with the method 200 shown in FIG. 14, according to an example implementation. In some examples, as shown at block 208, the duct 148 has the nozzles 154a-b (or 154 a-d), and the method 200 also includes causing the pressure difference by increased airflow velocity through the nozzles 154a-b (or 154 a-d) of the duct 148.

FIG. 16 shows another flowchart of an example function that is performed with the method 200 shown in FIG. 14, according to an example implementation. In some examples, as shown at block 210, the duct 148 includes the nozzles 154a-b (or 154 a-d) and the barrels 156a-b (or 156a-d) coupled to the air distribution inlet 144, and the method 200 also includes creating a lower pressure inside the duct 148 as compared to the passenger area 112 in the fuselage 106 by directing airflow through the nozzles 154a-b (or 154a-d) and the barrels 156a-b (or 156a-d) in order to further draw the secondary air 147 into the cabin air inlet 146.

Referring back to FIG. 14, at block 206, the method 200 includes sensing, by the temperature sensor 150 coupled to the duct 148 and positioned downstream of the cabin air inlet 146 along an airflow path of the secondary air 147, a temperature of the secondary air 147 drawn in through the cabin air inlet 146 and flowing through the duct 148.

FIG. 17 shows another flowchart of an example function that is performed with the method 200 shown in FIG. 14, according to an example implementation. In some examples, as shown at block 212, the method 200 also includes mixing the secondary air 147 drawn into the cabin air inlet 146 to the duct 148 with the primary air 145 blown into the air distribution inlet 144 after the secondary air 147 drawn into the cabin air inlet 146 to the duct 148 passes by the temperature sensor 150. For example, the two flows of air (i.e., primary air 145 and secondary air 147) do not mix until after the secondary air 147 drawn in through the cabin air inlet 146 passes the temperature sensor 150. This allows the temperature sensor 150 to detect air temperature of the secondary air 147 (e.g., air temperature in the cabin of the fuselage 106) and not be affected by the primary air 145 from the environmental control system 130.

Within examples, the method 200 also includes exhausting the primary air 145 mixed with the secondary air 147 to an area between the passenger area 112 of the fuselage 106 and the fuselage perimeter 120 of the fuselage 106.

Using the aircraft system 140 described herein enables air temperatures to be determined while providing a tamper proof temperature sensing device that is remotely located and out of sight from passengers. Further, since the temperature sensing device 122 does not include a fan to draw cabin air into an air duct that contains the temperature sensor 150, the temperature sensing device 122 can operate with decreased noise compared to conventional temperature sensing devices.

Note that although this disclosure has described use of the methods and systems for use on aircraft, the same functions and device can apply equally to use of the methods and system on board any type of vehicle to draw air past a temperature sensor in a passive manner. The methods and systems can also find use within non-vehicles or stationary areas as well wherever sensing of air temperatures is desired.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A temperature sensing device comprising:
    an air distribution inlet through which primary air is blown into via an environmental control system;
    a cabin air inlet through which secondary air enters from a passenger area of a fuselage, wherein the cabin air inlet is coupled to the air distribution inlet through a duct and the secondary air is passively drawn into the cabin air inlet and to the duct due to a pressure difference present in the duct; and
    a temperature sensor coupled to the duct and positioned downstream of the cabin air inlet along an airflow path of the secondary air so as to be exposed to the secondary air drawn in through the cabin air inlet and flowing through the duct,
    wherein the duct comprises:
        a plurality of barrels positioned downstream of the air distribution inlet and the temperature sensor, within which the primary air mixes with the secondary air, and
        a plurality of nozzles disposed within the duct, coupled to the air distribution inlet, positioned between the air distribution inlet and the plurality of barrels, and configured to accelerate the primary air before the primary air enters the plurality of barrels.

2. The temperature sensing device of claim 1, wherein the secondary air is drawn into the cabin air inlet due to air ejector principles.

3. The temperature sensing device of claim 1, wherein the pressure difference is caused by increased airflow velocity through the nozzles of the duct.

4. The temperature sensing device of claim 1, wherein the plurality of barrels are configured to direct airflow so as to create a lower pressure inside the duct as compared to the passenger area of the fuselage to further draw the secondary air into the cabin air inlet.

5. The temperature sensing device of claim 4, wherein the barrels comprise additively manufactured components.

6. The temperature sensing device of claim 1, wherein the air distribution inlet, the cabin air inlet, and the duct comprise additively manufactured components.

7. The temperature sensing device of claim 1, wherein the duct comprises:
   an opening into which a portion of the temperature sensor is inserted so as to be exposed to the secondary air drawn in through the cabin air inlet and flowing through the duct.

8. The temperature sensing device of claim 1, wherein a portion of the duct that connects to the cabin air inlet is an angled portion.

9. The temperature sensing device of claim 1, further comprising:
   an air grille coupled to the cabin air inlet through which the secondary air enters from the passenger area of the fuselage.

10. The temperature sensing device of claim 1, wherein the secondary air drawn into the cabin air inlet to the duct mixes with the primary air blown into the air distribution inlet after the secondary air drawn into the cabin air inlet to the duct passes by the temperature sensor.

11. The temperature sensing device of claim 10, further comprising:
    an exhaust coupled to the duct to exhaust the primary air mixed with the secondary air to an area between the passenger area of the fuselage and a fuselage perimeter of the fuselage.

12. An aircraft system comprising:
    an interior panel of a fuselage including an air grille; and
    a temperature sensing device comprising:
        an air distribution inlet through which primary air is blown into via an environmental control system;
        a cabin air inlet coupled to the air grille and through which secondary air enters from a passenger area of the fuselage, wherein the cabin air inlet is coupled to the air distribution inlet through a duct and the secondary air is passively drawn into the cabin air inlet and to the duct due to a pressure difference present in the duct; and
        a temperature sensor coupled to the duct and positioned downstream of the cabin air inlet along an airflow path of the secondary air so as to be exposed to the secondary air drawn in through the cabin air inlet and flowing through the duct
    wherein the duct comprises:
        a plurality of barrels positioned downstream of the air distribution inlet and the temperature sensor, within which the primary air mixes with the secondary air, and
        a plurality of nozzles disposed within the duct, coupled to the air distribution inlet, positioned between the air distribution inlet and the plurality of barrels, and configured to accelerate the primary air before the primary air enters the plurality of barrels.

13. The aircraft system of claim 12, wherein the temperature sensing device is mounted to a surface of the interior panel opposite the passenger area of the fuselage.

14. The aircraft system of claim 12, wherein the plurality of barrels are configured to direct airflow so as to create a lower pressure inside the duct as compared to the passenger area in the fuselage to further draw the secondary air into the cabin air inlet.

15. The aircraft system of claim 12, wherein the duct comprises:
    an opening into which a portion of the temperature sensor is inserted so as to be exposed to the secondary air drawn in through the cabin air inlet and flowing through the duct.

16. The aircraft system of claim 12, wherein the secondary air is drawn into the cabin air inlet due to air ejector principles.

17. The aircraft system of claim 12, wherein the pressure difference is caused by increased airflow velocity through the nozzles of the duct.

18. The aircraft system of claim 12, wherein a portion of the duct that connects to the cabin air inlet is an angled portion.

19. The aircraft system of claim 12, wherein the secondary air drawn into the cabin air inlet to the duct mixes with the primary air blown into the air distribution inlet after the secondary air drawn into the cabin air inlet to the duct passes by the temperature sensor.

20. The aircraft system of claim 12, wherein the temperature sensing devices further comprises:
    an exhaust coupled to the duct to exhaust the primary air mixed with the secondary air to an area between the passenger area of the fuselage and a fuselage perimeter of the fuselage.

* * * * *